Figure 1:
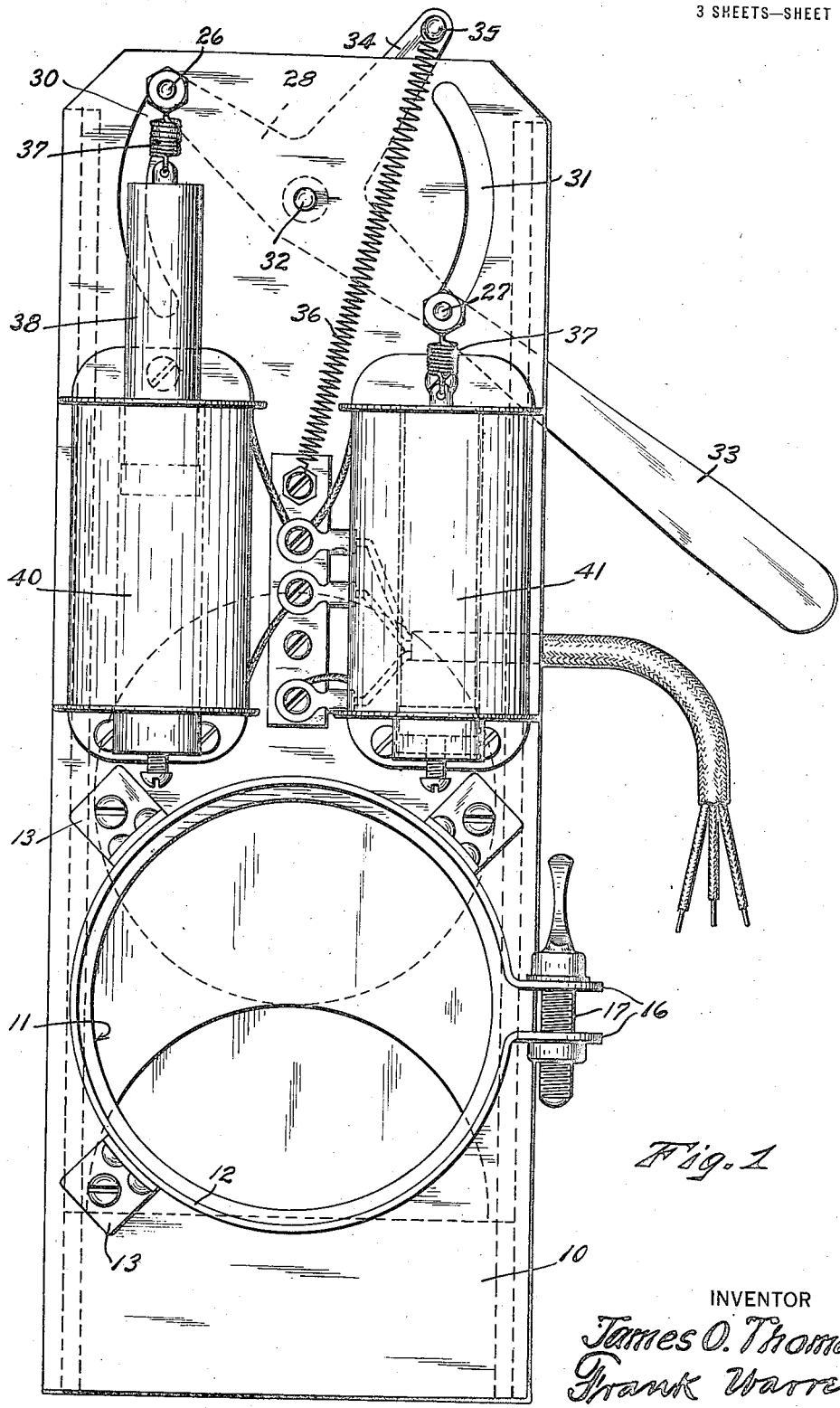

J. O. THOMAS.
LIGHT CONTROL MECHANISM FOR PROJECTORS.
APPLICATION FILED JULY 18, 1921.

1,436,370.

Patented Nov. 21, 1922.
3 SHEETS—SHEET 1.

INVENTOR
James O. Thomas.
Frank Warren
ATTORNEY

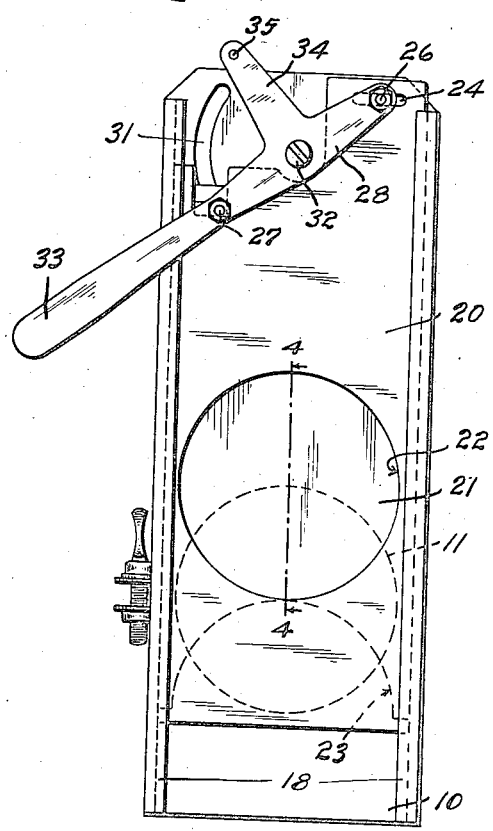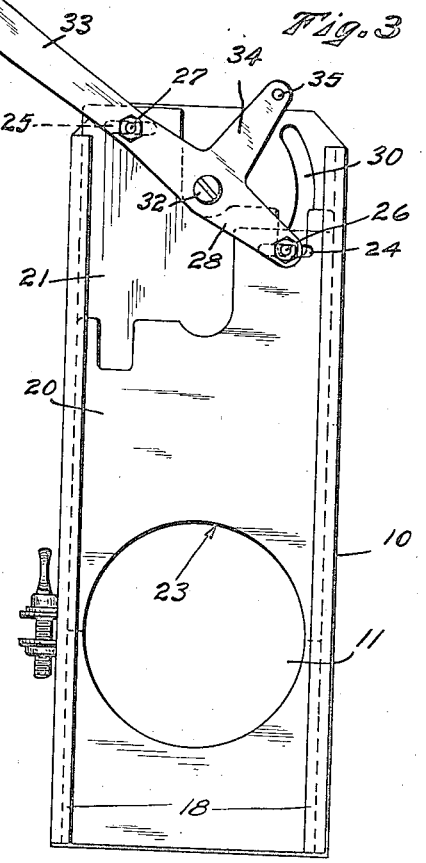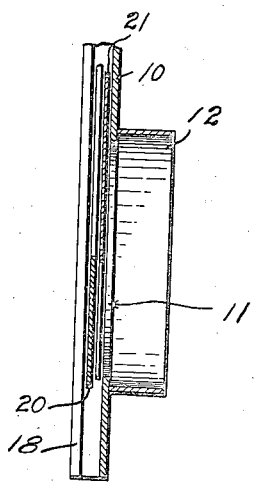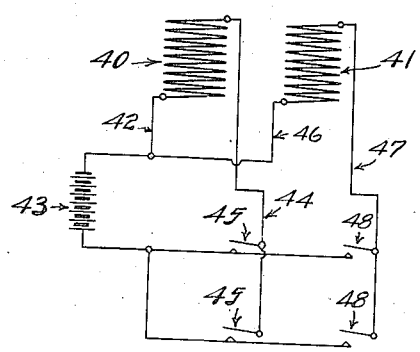

J. O. THOMAS.
LIGHT CONTROL MECHANISM FOR PROJECTORS.
APPLICATION FILED JULY 18, 1921.
1,436,370.
Patented Nov. 21, 1922.
3 SHEETS—SHEET 3.
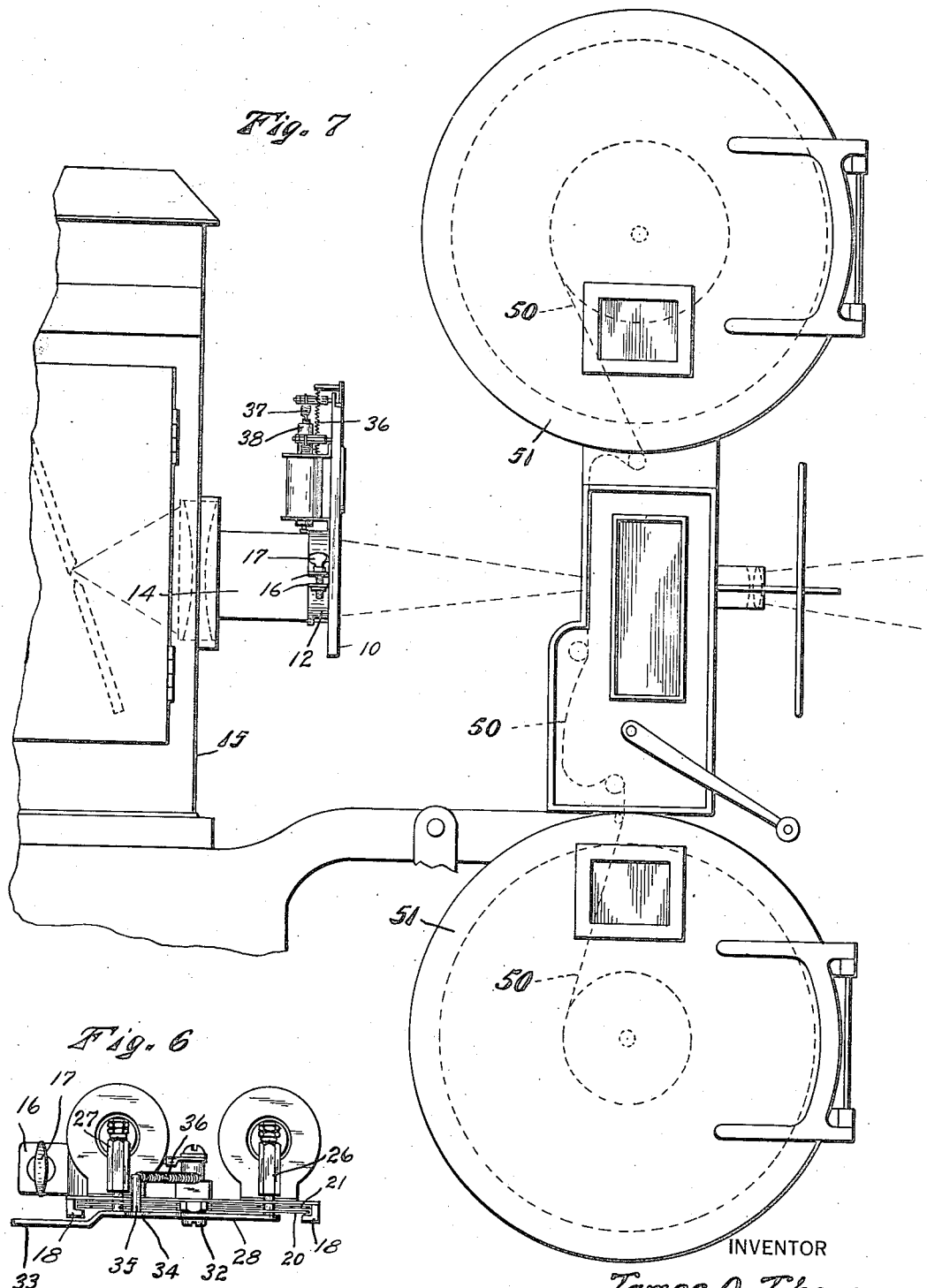
INVENTOR
James O. Thomas.
Frank Warren
ATTORNEY Patented Nov. 21, 1922.

1,436,370

UNITED STATES PATENT OFFICE.

JAMES O. THOMAS, OF VANCOUVER, BRITISH COLUMBIA, CANADA.

LIGHT-CONTROL MECHANISM FOR PROJECTORS.

Application filed July 18, 1921. Serial No. 485,733.

*To all whom it may concern:*

Be it known that I, JAMES O. THOMAS, a citizen of the United States, residing at Vancouver, in the Province of British Columbia and Dominion of Canada, have invented a certain new and useful Improvement in Light-Control Mechanisms for Projectors, of which the following is a specification.

My invention relates to improvements in light control mechanisms for moving picture projectors or machines and the object of my invention is to provide a light control mechanism for moving picture projectors adapted to function as an automatic dissolving dowser when used simultaneously with a plurality of projectors to thus dissolved the picture projected from one projector into that projected from the associated projector during the changing over operation.

Another object is to provide a light control mechanism for a moving picture projector adapted to be operatively secured upon the lamphouse tube of said projector and to be actuated from points remote from said projector to thus cut off the light from said lamphouse when it is necessary or found desirable, as for example, in the event of the breaking of the film, or the stoppage of the latter or for any reason whatsoever.

A further object is to provide light control apparatus of this nature that is electromagnetically operated and that may be controlled from electric switches disposed at a distance from the picture projector so that if the film breaks or another accident occurs when the operator of the projector is away from the machine he may quickly and easily shut off the light by closing one of said switches.

A still further object is to provide light controlled apparatus of this nature having devices by which it may be manually operated in addition to the electromagnetic operating means.

A still further object is to provide light control apparatus for moving picture projectors including a shutter that is simple in construction, reliable in operation, neat in appearance, easy to attach to a projector and not expensive to manufacture.

Other objects will be apparent from the following description taken in connection with the accompanying drawings.

In the drawings, Figure 1 is a view in elevation of the rear side of a light control apparatus constructed in accordance with my invention;

Figs. 2 and 3 are views in front elevation of the same, showing the shutter elements in the closed and open positions respectively;

Fig. 4 is a fragmentary sectional view substantially on broken line 4, 4 of Fig. 2; Fig. 5 is a diagram showing one system of wiring for the electromagnets; Fig. 6 is a plan view of the device; and Fig. 7 is a view in side elevation showing the device on a moving picture projector of well known form.

Like reference numerals designate like parts throughout the drawings.

The films that are used in moving picture machines are highly inflammable and if they are stopped for any length of time in the path of the light from the projector are liable to be ignited thus damaging the film and often resulting in disastrous fires. The present invention is intended to prevent these accidents by making it possible to shut off the light the instant the film stops or breaks.

Referring to the drawings the numeral 10 designates a rectangularly shaped metallic plate having a circular opening 11 near the bottom end thereof and having an annular split collar 12 surrounding said opening and secured by brackets 13 to the rear side of the plate in such a manner that it may be fixedly clamped upon the outer end of the lamp house tube 14 of a lamp house 15 of a moving picture projector of well known form, the ends of the said collar 12 being bent outwardly as at 16, and having a thumb screw 17 threaded therethrough by which the collar may be contracted.

The side edges of the plate 10 have angular members 18 secured thereto, as in Fig. 6, to form guideways wherein two overlapping shutter elements 20 and 21 may reciprocate, the outmost shutter element 20 having a circular opening 22 corresponding to the opening 11 in the plate 10 and the innermost or underying shutter element 21 having a semicircular recess 23 of the same radial dimension as the opening 11 at the bottom end.

The upper ends of the shutter members 20 and 21 are provided with transverse slots 24 and 25 that fit over stud pins 26 and 27 that are rigidly secured to a rocker arm 28 and project rearwardly through curved slots 30 and 31 in the plate 10. The rocker arm 28 is fulcrumed on a fixed pivot 32 that is located midway between the stud pins 26 and 27 so that when the rocker arm 28 is oscillated the shutter members will be simultaneously moved in opposite directions to cover and uncover the opening 11.

The top ends of the shutter members 20 and 21 are cut away as shown in Figs. 2 and 3 to clear the pivot 32 and stud pins 26 and 27.

The rocker arm 28 projects outwardly at one end to form a handle 33 by which said rocker arm may be manually oscillated and such rocker arm is provided at the location of the pivot 32 with an upwardly projecting arm 34 having a rearwardly projecting stud 35 that is connected with the upper end of a tension spring 36, the lower end of which is fixedly secured to the plate 10, as shown in Fig. 1, so that when the rocker arm 28 is moved into either the position shown in Fig. 2 or the position shown in Fig. 3, it will be yieldingly held in such position by the spring 36.

The stud pins 26 and 27 are connected by spring connectors 37 with the cores 38 of electromagnets 40 and 41 that are mounted on the plate 10. The electromagnet 40, as in Fig. 5, is connected by circuit wire 42 with one terminal of a battery 43 or other source of supply of electrical circuit and by circuit wire 44 with switches 45 that are each connected with the other terminal of the battery 43 so that when one of the switches 45 is closed current will be allowed to pass through the electromagnet 40. In a similar way the electromagnet 41 is connected by circuit wire 46 with one terminal of the battery 43 and by circuit wire 47 with switches 48 that are each connected with the other terminal of the battery 43. When the switches 45 or 48 are closed current will flow through the electromagnets 40 and 41 which are in separate circuit and may be energized independently of each other to move the shutters to either an open or closed position.

The switches will preferably be arranged in pairs one of each pair being a switch 45 that controls the opening of the shutter members and the other being a switch 48 that controls the closing of the shutter members. The switches may be disposed at convenient locations around the operating room in which the projector is located or outside of such operating room so that if the operator leaves the projector one of the switches will always be close at hand and may be closed to shut off the light the instant the film stops moving or breaks or any accident happens to any of the mechanism of the projector.

In use the device is clamped upon the lamphouse tube 14 of the lamphouse 15, as shown in Fig. 7 with the opening 11 directly in front of the open end of the tube 14 so that when the shutter members 20 and 21 are closed the light that is ordinarily projected through the tube 14 and through a film, as 50, that is actuated by the film reel mechanism 51 of the projector will be intercepted, as will be readily apparent.

When the rocker arm 28 is in the position shown in Fig. 3, the circular opening 22 in the shutter member 20 and the semi-circular recess 23 in the shutter member 21 will register with the opening 11 in the plate 10, thus leaving an unobstructed opening through which light may pass. On the closing of a switch 48 when the shutters are in the open position, the rocker arm 28 will be moved into the position shown in Figs. 1 and 2, thereby raising the shutter member 20 and lowering the shutter member 21 sufficiently to close the opening through which the light is projected. When the shutter members are in closed position they may be opened by closing a switch 45 and energizing the solenoid 40. The shutter members may also be manually opened or closed at any time by grasping the handle 33 and moving the rocker arm 28.

From the preceding description it will be seen that the light control apparatus makes it possible to shut off the light from points at any distance removed from the projector the instant the film stops, or any accident happens to any part of the mechanism that carries the film thereby lessening the danger of damaging the film and starting destructive fires.

The foregoing description taken in connection with the accompanying drawings clearly discloses the principles of construction and method of operation of my invention, but, while I have shown and described what I now consider to be the preferred form of the device it will be understood that the drawings are merely illustrative and that such changes may be resorted to as are within the scope and spirit of my invention.

What I claim is:

1. A shutter attachment for the lamphouse tube of a projector comprising a rectangular frame plate having a circular opening, means for securing said frame to said tube or with said opening in alignment with said tube, guideways at the sides of said frame plate, a shutter plate slidable in said guideways and having a semicircular recess in its bottom end, another shutter plate slidable in said guideways and having a circular opening adjacent its bottom end, said two shutter plates being arranged to be moved to cover or uncover the opening in said frame plate, a rocker arm pivoted medially of said frame plate, means for securing said shutter plates to said rocker arm on opposite sides of said pivot respectively, whereby when said rocker arm is oscillated said shutter plates will be moved simultaneously in opposite directions, and means for oscillating said rocker arm.

2. A shutter attachment for the lamphouse tube of a projector comprising a stationary frame plate having a circular opening therein, means for securing the plate to the tube with the plate opening alined with the tube, a pair of shutter plates slidably mounted on the frame plate, one of the shutter plates having a semi-circular opening therein and the other shutter plate having a circular opening therein, the shutter plates being shiftable to aline the openings with the opening in the frame plate, a lever pivoted to the frame plate, and pin and slot connections between the lever and the shutter plates at opposite sides of the lever pivot for sliding the shutter plates in opposite directions to open and close the opening in the frame plate.

3. A shutter attachment for the lamphouse tube of a projector comprising a stationary frame plate having a circular opening therein, means for securing the plate to the tube with the plate opening alined with the tube, a pair of shutter plates slidably mounted on the frame plate, one of the shutter plates having a semi-circular opening therein and the other shutter plate having a circular opening therein, the shutter plates being shiftable to aline the openings with the opening in the frame plate, a lever pivoted to the frame plate, and pin and slot connections between the lever and shutter plates disposed at right angles to each other and at opposite sides of the lever pivot for sliding the shutter plates in opposite directions to open and close the opening in the frame plate.

4. A shutter attachment for the lamphouse tube of a projector comprising a stationary frame plate having a circular opening therein, means for securing the plate to the tube with the plate opening alined with the tube, a pair of shutter plates slidably mounted on the frame plate, one of the shutter plates having a semi-circular opening therein and the other shutter plate having a circular opening therein, the shutter plates being shiftable to aline the openings with the opening in the frame plate, a lever pivoted to the frame plate, and pin and slot connections between the lever and the shutter plates at opposite sides of the lever pivot for sliding the shutter plates in opposite directions to open and close the opening in the frame plate, one of the shutter plates having a portion thereof cut away to provide a clearance for one of the pin and slot connections and the sliding movement of the other shutter plate.

5. A shutter attachment for the lamphouse tube of a projector comprising a stationary frame plate having a circular opening therein, means for securing the plate to the tube with the plate opening alined with the tube, a pair of shutter plates slidably mounted on the frame plate, one of the shutter plates having a semi-circular opening therein and the other shutter plate having a circular opening therein, the shutter plates being shiftable to aline the openings with the opening in the frame plate, a lever pivoted to the frame plate, and pin and slot connections between the lever and shutter plates disposed at right angles to each other and at opposite sides of the lever pivot for sliding the shutter plates in opposite directions to open and close the opening in the frame plate, one of the shutter plates having a portion thereof cut away to provide a clearance for one of the pin and slot connections and the sliding movement of the other shutter plate.

6. A shutter attachment for the lamphouse tube of a projector comprising a stationary frame plate having a circular opening therein, means for securing the plate to the tube with the plate opening alined with the tube, a pair of shutter plates slidably mounted on the frame plate, one of the shutter plates having a semi-circular opening therein and the other shutter plate having a circular opening therein, the shutter plates being shiftable to aline the openings with the opening in the frame plate, a lever pivoted to the frame plate, pin and slot connections between the lever and the shutter plates at opposite sides of the lever pivot for sliding the shutter plates in opposite directions to open and close the opening in the frame plate, and an electro-magnet resiliently connected to each pin and slot connection for moving the lever and shifting the shutter plates.

7. A shutter attachment for the lamphouse tube of a projector comprising a stationary frame plate having a circular opening therein, means for securing the plate to the tube with the plate opening alined with the tube, a pair of shutter plates slidably mounted on the frame plate, one of the shutter plates having a semi-circular opening therein and the other shutter plate having a circular opening therein, the shutter plates being shiftable to aline the openings with the opening in the frame plate, a lever pivoted to the frame plate, pin and slot connections between the lever and shutter plates disposed at right angles to each other and at opposite sides of the lever pivot for sliding the shutter plates in opposite directions to open and close the opening in the frame plate, and an electro-magnet resiliently connected to each pin and slot connection for moving the lever and shifting the shutter plates.

8. A shutter attachment for the lamphouse tube of a projector comprising a stationary frame plate having a circular opening therein, means for securing the plate to the tube with the plate opening alined with the tube, a pair of shutter plates slidably mounted on the frame plate, one of the shutter plates having a semi-circular opening therein and the other shutter plate having a circular opening therein, the shutter plates being shiftable to aline the openings with the opening in the frame plate, a lever pivoted to the frame plate, pin and slot connections between the lever and the shutter plates at opposite sides of the lever pivot for sliding the shutter plates in opposite directions to open and close the opening in the frame plate, one of the shutter plates having a portion thereof cut away to provide a clearance for one of the pin and slot connections and the sliding movement of the other shutter plate, and an electromagnet resiliently connected to each pin and slot connection for moving the lever and shifting the shutter plates.

9. A shutter attachment for the lamphouse tube of a projector comprising a stationary frame plate having a circular opening therein, means for securing the plate to the tube with the plate opening alined with the tube, a pair of shutter plates slidably mounted on the frame plate, one of the shutter plates having a semi-circular opening therein and the other shutter plate having a circular opening therein, the shutter plates being shiftable to aline the openings with the opening in the frame plate, a lever pivoted to the frame plate, pin and slot connections between the lever and shutter plates disposed at right angles to each other and at opposite sides of the lever pivot for sliding the shutter plates in opposite directions to open and close the opening in the frame plate, one of the shutter plates having a portion thereof cut away to provide a clearance for one of the pin and slot connections and the sliding movement of the other shutter plate, and an electromagnet resiliently connected to each pin and slot connection for moving the lever and shifting the shutter plates.

In witness whereof, I hereunto subscribe my name this 8th day of July A. D. 1921.

JAMES O. THOMAS.